US011495950B2

(12) United States Patent
Hamilton, Jr.

(10) Patent No.: US 11,495,950 B2
(45) Date of Patent: Nov. 8, 2022

(54) VEHICLE JUNCTION BOX ASSEMBLY HAVING A TOP COVER WITH AN OFFSET OPENING

(71) Applicant: Sumitomo Wiring Systems, Ltd., Yokkaichi (JP)

(72) Inventor: Kyles O. Hamilton, Jr., Farmington Hills, MI (US)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 186 days.

(21) Appl. No.: 17/097,536

(22) Filed: Nov. 13, 2020

(65) Prior Publication Data
US 2022/0158428 A1    May 19, 2022

(51) Int. Cl.
*H02G 3/08* (2006.01)
*H02G 3/14* (2006.01)

(52) U.S. Cl.
CPC .............. *H02G 3/083* (2013.01); *H02G 3/14* (2013.01)

(58) Field of Classification Search
CPC ................................. H02G 3/14; H02G 3/083
See application file for complete search history.

(56) References Cited

U.S. PATENT DOCUMENTS

| | | | | |
|---|---|---|---|---|
| 2,672,562 | A * | 3/1954 | Frank | H01R 13/70 200/11 R |
| 6,642,633 | B1 * | 11/2003 | Yang | H01M 50/20 307/10.6 |
| 6,679,708 | B1 * | 1/2004 | Depp | H01R 9/2466 361/752 |
| 2021/0320483 | A1 * | 10/2021 | Otsuba | H02G 3/088 |

* cited by examiner

*Primary Examiner* — Timothy J Thompson
*Assistant Examiner* — Rhadames Alonzo Miller
(74) *Attorney, Agent, or Firm* — Honigman LLP

(57) ABSTRACT

A top cover includes a cover portion and a jump start terminal cover. The cover portion includes a peripheral wall. The peripheral wall includes a side portion that extends along a first plane. The cover portion includes an opening configured to house a jump start terminal. The opening includes a plurality of tabs that are spaced apart from each other so as to define a corresponding slot. One of the slots is a side-slot which extends orthogonal to the side portion of the peripheral wall. The jump start terminal cover is configured to cover the jump start terminal. The jump start terminal cover includes a plurality of prongs corresponding to the number of slots one of the prongs engages the side-slot.

11 Claims, 5 Drawing Sheets

VEHICLE JUNCTION BOX ASSEMBLY HAVING A TOP COVER WITH AN OFFSET OPENING

TECHNICAL FIELD

The disclosure relates to a junction box assembly. In particular, the disclosure relates to a junction box assembly having a top cover with an offset opening.

BACKGROUND

The junction box assemblies are known for use in automotive vehicles. In some instances, the junction box assembly is configured to provide a jump terminal. The jump terminal is configured to provide power to the starter so as to start the car in the event that the vehicle battery is drained. The jump terminal is housed beneath a top cover and is accessed by a jump start terminal cover.

As shown in FIG. 1, an illustrative view of the current top cover 200 is shown. The jump start terminal which is not shown, is accessible through an opening 202 of the top cover 200. The opening includes a plurality of tabs 204 which define slots 206.

A depiction of a conventional jump start terminal cover 208 is provided in FIG. 2. The jump start terminal cover includes three prongs 210. The prongs 210 are equally spaced apart from each other and extend downwardly from a bottom surface of the jump start terminal cover 208.

With reference now to FIG. 3, a depiction showing the engagement of the prongs 210 with a corresponding slot 206. The user typically lifts the jump start terminal cover 208 by pressing a lip portion 212 upward, as shown by the arrow. As shown, this places a load on the edge 206a1 of tab 206a, making the removal difficult.

Accordingly, it is desirable to have a top cover wherein a removal of the jump start terminal cover may be facilitated with less force relative to the current art yet retains the same engagement so as to retain the jump start terminal cover onto the top cover.

SUMMARY

In one aspect a top cover for use with a junction box assembly having a jump start terminal is provided. The top cover includes a cover portion. The cover portion has a peripheral wall. The peripheral wall includes a side portion extending along a first plane.

The cover portion has an opening for accommodating the jump start terminal. The opening includes a plurality of tabs spaced apart from each other. Each of the tabs extend radially from an inner peripheral edge, which defines the opening, toward a center of the opening. The plurality of tabs define a corresponding plurality of slots. The slots are positioned such that one of the plurality of slots is a side-slot extending orthogonal to the side portion of the peripheral wall.

A jump start terminal cover is configured to cover the jump start terminal. The jump start terminal cover includes a plurality of prongs corresponding to the member of slots. One of the plurality of prongs is configured to engage the side-slot so as to reduce a force required to remove the jump start terminal cover.

In one aspect the jump start terminal cover includes a tether. The tether is configured to attach to an anchor point of the cover portion.

In another aspect, the jump start terminal cover includes a top wall and an inner wall portion. The inner wall portion is recessed with respect to a peripheral edge of the top wall. The inner wall portion extends from a bottom surface of the top wall.

In another aspect, the jump start terminal cover includes a shield portion. The shield portion bounds an outer periphery of the plurality of prongs.

In another aspect, the cover portion includes a cover housing. The cover housing is defined by a first housing wall, a second housing wall and a housing floor. The first housing wall is orthogonal to the second housing wall and the opening is disposed on the housing floor.

In another aspect, each of the plurality of prongs is longer than the shield portion.

In another aspect, the jump start terminal cover includes three prongs.

In another aspect, the top cover includes a registration number. The registration number is disposed on the housing floor. The registration number includes a base and an abutment. The abutment is disposed on the base so as to be elevated relative to the housing floor.

In another aspect, the top cover includes a register wall. The register wall is mounted to the jump start terminal cover. The register wall is configured to engage the registration number so as to position the plurality of prongs into an alignment with their respective slot.

In another aspect, the abutment includes at least one panel. The panel is disposed on the base. The panel has a height configured to engage a bottom surface of the jump start terminal cover.

In another aspect, the panel has a top edge. The top edge is angled downwardly from the center of the base to an edge of the base.

Accordingly, the top cover is configured so as to have the prong of the jump start terminal cover engaged with a side-slot of the opening. As the side-slot extends orthogonal to the side portion of the peripheral wall of the opening, lifting the jump start terminal cover simply requires overcoming an engagement force between the side-slot and the prong of the jump start terminal cover. In particular, the lifting load is centered with respect to the center of the tab so as to distribute the force equally along the tab. Thus, the force is less than the force of the prior art top cover as the prior art top cover may direct the lifting load to an edge of the tab. Further, the top cover has an engagement feature which properly aligns a respective prong with the slots so as to prevent deformation of the prongs due to a misaligned engagement.

DETAILED DESCRIPTION OF PREFERRED EMBODIMENTS

A top cover for use with a junction box assembly having a jump start terminal is provided. The top cover includes a cover portion and a jump start terminal cover. The cover portion includes a peripheral wall. The peripheral wall includes a side portion that extends along a first plane.

The cover portion includes an opening configured to house a jump start terminal wherein the jump start terminal extends out of the opening. The opening includes a plurality of tabs that are spaced apart from each other and extend radially from an inner peripheral edge of the opening towards a center of the opening.

The tabs are spaced apart from each other so as to define a corresponding slot. One of the slots is a side-slot which extends orthogonal to the side portion of the peripheral wall. The jump start terminal cover is configured to cover the jump start terminal. The jump start terminal cover includes a plurality of prongs corresponding to the number of slots. One of the prongs engages the side-slot so as to reduce a force required to remove the jump start terminal cover relative to the prior art.

Figure 1:
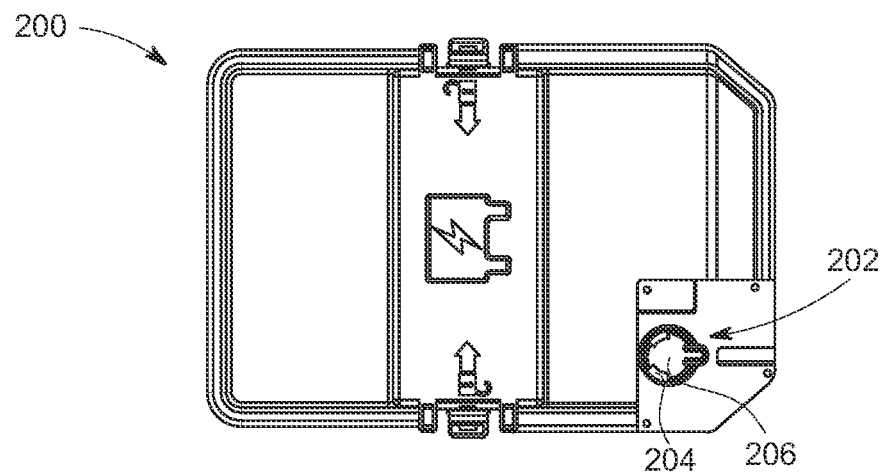
FIG. 1 is a perspective view of a top cover of the prior art.
Figure 2:
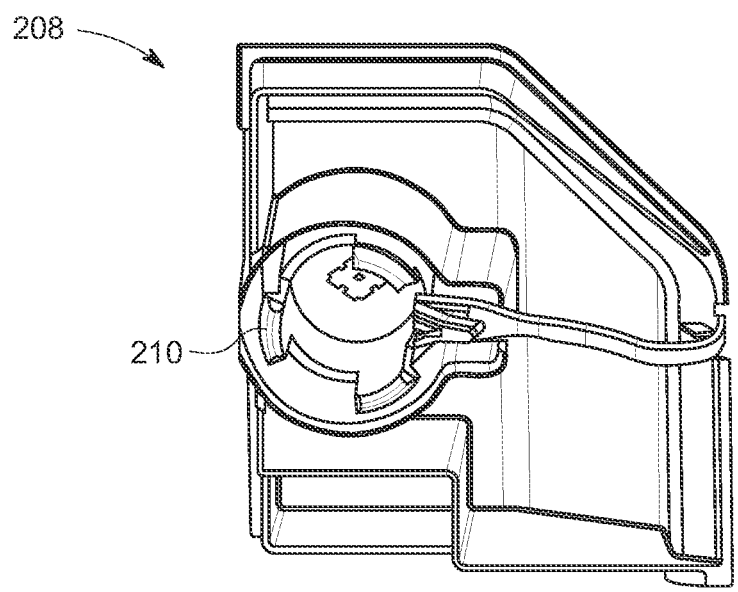
FIG. 2 is a perspective view of a jump start terminal cover of the prior art.
Figure 3:
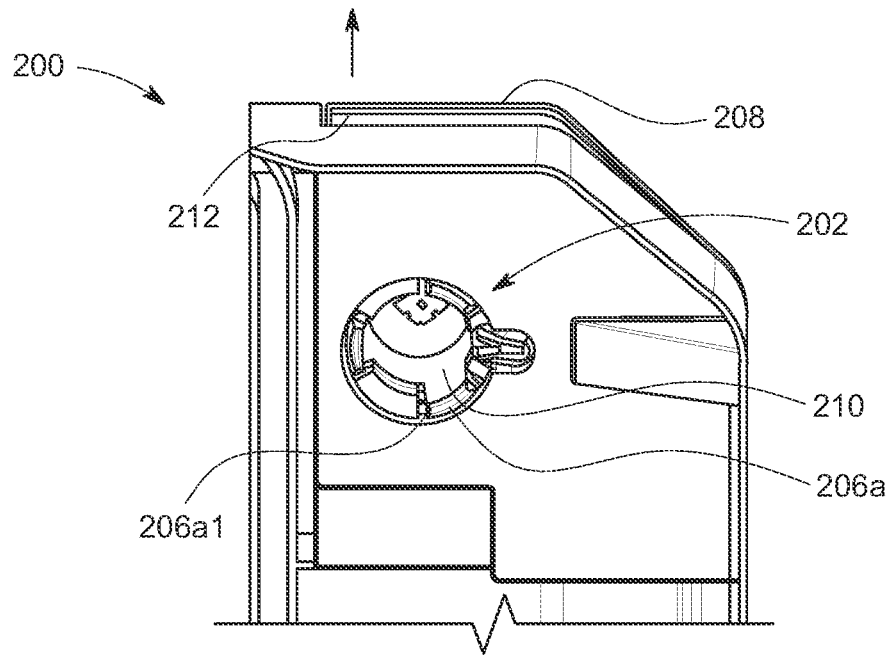
FIG. 3 is a depiction showing the jump start terminal cover in FIG. 2 engaged with the cover portion shown in FIG. 1.
Figure 4:
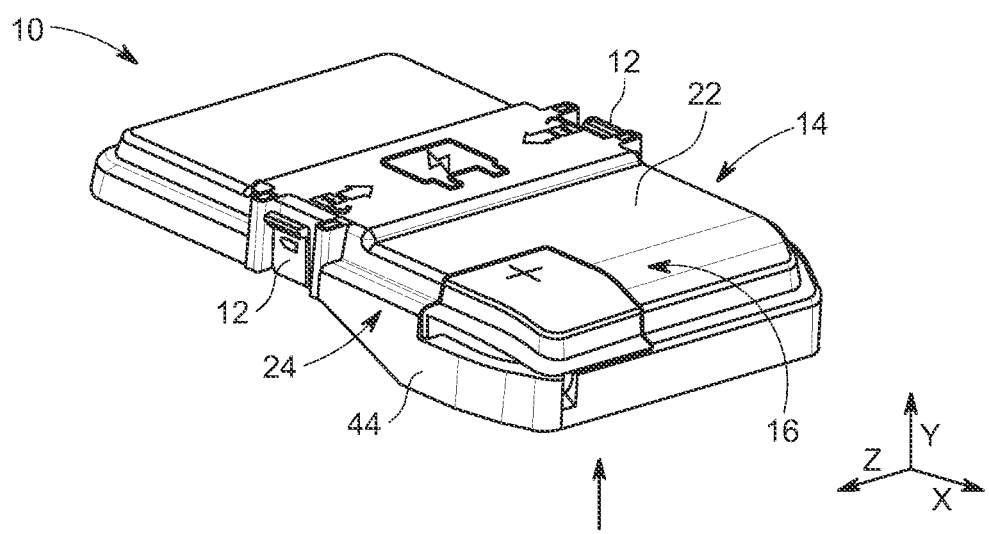
FIG. 4 is a perspective view of a top cover according to one aspect illustrated herein.

With reference now to FIG. 4, a top cover 10 is provided. The top cover 10 may be formed of a material suitable for an injection molding process. Such material illustratively includes polypropylene, abs polyoxymethylene, polycarbonate, thermal plastics and the like. The top cover 10 may include fastening members 12 configured to secure the top cover 10 to the junction box (not shown). For illustrative purposes, the top cover 10 is shown as having a pair of fastening members 12. The fastening members 12 are illustratively shown as a pair of resilient tabs which are configured to snap into a corresponding receiving slot (not shown) of the junction box. It should be appreciated that any fastening member, currently known or later developed may be adapted for use herein.

The top cover 10 includes a cover portion 14 and a jump start terminal cover 16. In particular, the cover portion 14 includes an opening 18 disposed in a jump start terminal housing 20. In one aspect the jump start terminal housing 20 is disposed on a corner of the cover portion 14 and the jump start terminal cover 16 covers the jump start terminal housing 20 so as to cover a jump start terminal (not shown).

Figure 5:
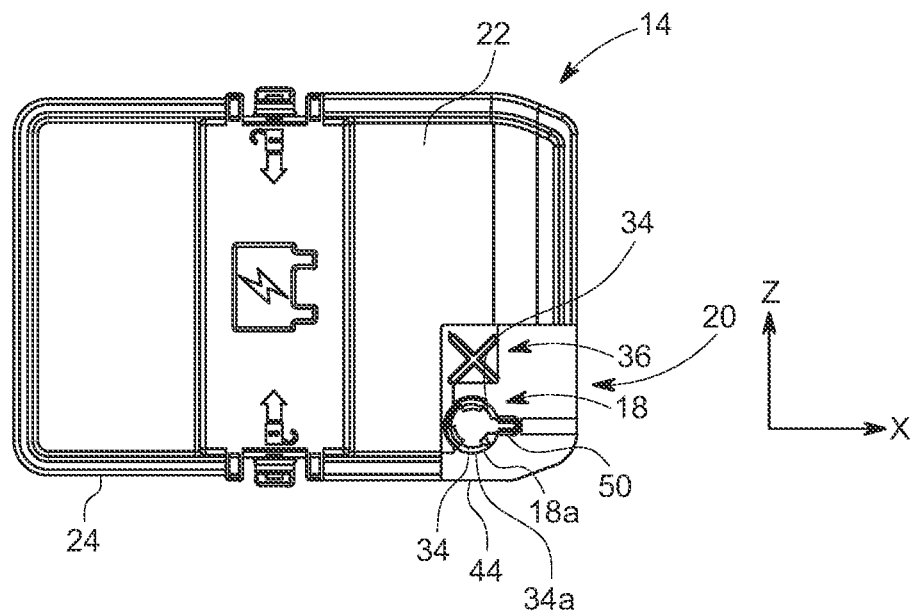
FIG. 5 is a top down view of FIG. 4 with the jump start terminal cover removed.

With reference now to FIG. 5, a top down view of the top cover 10 is provided showing the jump start terminal cover 16 removed. As stated above, the jump start terminal housing 20 is disposed on a corner of the cover portion 14. The jump start terminal housing 20 includes an opening 18 configured to receive the jump start terminal. The opening 18 is bound by a radial wall 18a.

The cover portion 14 includes a hood 22 and a peripheral wall 24. The hood 22 is a generally planar member extending substantially along the plane defined by axes "z" and "x". The peripheral wall 24 bounds the periphery edge of the hood 22 and extends downwardly along axis "y".

The jump start terminal housing 20 is defined by a first housing wall 26, a second housing wall 28 and a housing floor 30. The first housing wall 26 is a generally planar member extending substantially along a plane defined by axes "y" and "x". The second housing wall 28 is a generally planar member extending substantially along a plane defined by axes "y" and "z". The housing floor 30 is recessed with respect to the hood 22. The housing floor 30 extend substantially along a place defined by axes "z" and "x". The first housing wall 26 and the second housing wall 28 are orthogonal to each other and extend upwardly from the housing floor 30.

The opening 18 includes a plurality of tabs 32. Each of the tabs 32 are spaced apart from each other so as to define a corresponding slot 34. The tabs 32 are a generally cuboidal member that is bent to conform along the peripheral edge of the opening 18. Preferably, the opening 18 includes three tabs 32 and each of the tabs 32 are dimensioned the same as the other.

In one aspect, the top cover 10 may further include a registration member 36. The registration member 36 is mounted to the housing floor 30. The registration member 36 is preferably formed as an integral part of the cover portion 14.

The registration member 36 includes a base 38 and an abutment 40. The base 38 may be a generally cuboidal member. The abutment 40 is disposed on a top surface of the base 38. The registration member 36 is bound on two sides by the respective first and second housing walls 26, 28.

The abutment 40 is illustratively shown as a panel 42. The panel 42 which is a generally thin planar member extending upwardly from the base 38. The panel 42 has a height which is configured to engage a bottom surface of the jump start terminal cover 16. The panel 42 includes a top edge 42-1. The top edge 42-1 is angled downwardly from a center of the base 38 to an edge of the base 38. For illustrative purposes the registration member 36 is shown as having four panels 42a, 42b, 42c, and 42b. The panels 42 are dimensioned differently from each other.

Figure 6:
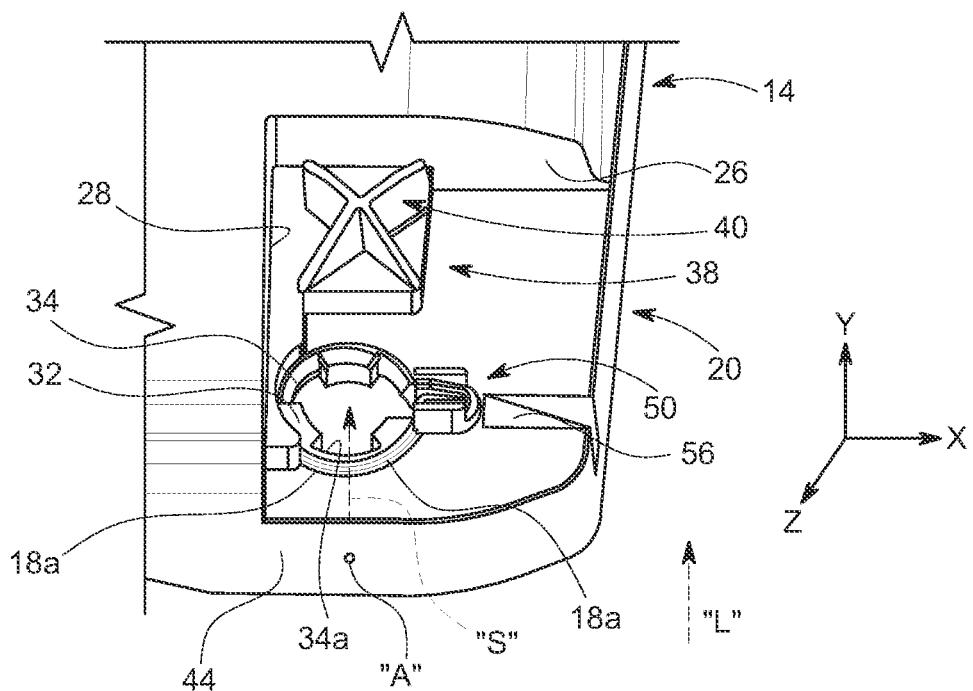
FIG. 6 is a close-up perspective view of the jump start terminal housing.

FIG. 6 depicts one aspect where a first panel 42a and a second panel 42b are shaped differently from a third panel 42c and a fourth panel 42d. The panels 42 extend from a center of the base 38 to a respective corner of the base 38. The first and second panels 42a, 42b have distal edges which have a height extending above the top surface of the base 38. The third and fourth panels 42c, 42d, which are closest to the opening 18, have a respective top edge 42-1 that are angled so as to be contiguous with the edges of the base 38. Such an aspect may be desirable so as to provide clearance for a tool to operate.

With reference again to FIG. 4, the peripheral wall 24 bounds the hood 22 of the cover portion 14. The peripheral wall 24 includes a side portion 44 of the peripheral wall 24 extends along a plane defined by axes "x" and "y". The opening 18 is adjacent the side portion 44 of the peripheral wall 24.

With reference again to FIG. 6, the jump start terminal housing 20 includes three slots 34 defined by the tabs 32. One of the slots 34 is a side-slot 34a. The side-slot 34a is dimensioned similar to the other slots 34. The side-slot 34a is positioned so as to center a lifting load at a center of the tab 32 engaged with the side-slot 34a. The lifting load extends along axis "y" and is depicted by the double arrow shown in FIG. 4.

Figure 7:
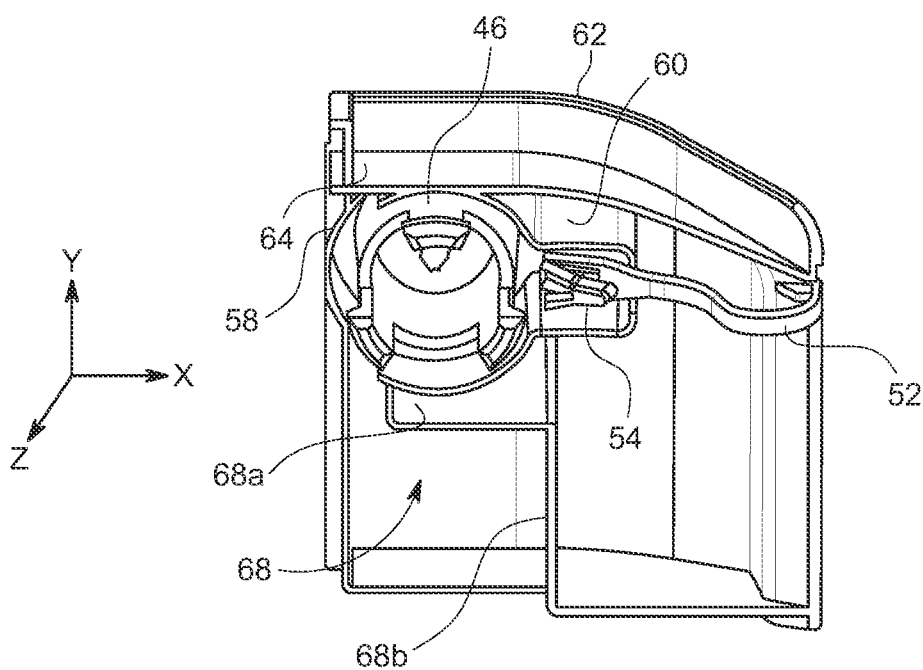
FIG. 7 is an isolated view of the jump start terminal cover taken from the bottom.

With now to FIG. 7, the jump start terminal cover 16 includes a plurality of prongs 46. The prongs 46 are spaced apart from each other and are configured to engage a respective slot 34. The prongs 46 are a generally elongated member having a catch 48 disposed on a distal end of the prong 46. The prongs 46 extend downwardly from a bottom surface of the jump start terminal cover 16. In a preferred aspect, the elongated portion of the prongs 46 have a generally arcuate shaped cross-section, as taken along the plane defined by axes "z" and "x" so as to conform to the slots 34 of the opening 18.

With reference again to FIG. 6, the side-slot 34*a* is centered about axis "S" which extends from the plane of the side portion 44 from point "A" indicated in FIG. 6. Axis "S" bisects the side-slot 34*a,* as such a lifting load "L" indicated by the double arrow is placed on the center of the tab 32 engaged with the side-slot 34*a* and is generally distributed equally along the width of the tab 32, reducing the force needed to remove the jump start terminal cover 16. It should be appreciated that when the prongs 46 jump start terminal cover 16 is inserted into the opening 18, the catches 48 of each prong 46 engages a bottom of a respective slot 34. As such, the lifting load "L" is equally distributed along the width of the catch 48 engaged with the side-slot 34*a,* reducing the force to disengage the prong from the side-slot 34*a* relative to the prior art configuration.

With reference again to FIGS. 6 and 7, the top cover 10 may further be configured to retain the jump start terminal cover 16 to the cover portion 14. In such an aspect, the top cover 10 may include an anchor point 50. The anchor point 50 is provided adjacent the periphery of the opening 18. With reference to a clock centered along the opening 18, the center of the side-slot 34*a* would be at 6:00 and the anchor point 50 is at 3:00. In other words, the anchor point 50 is offset the side-slot 34*a* by ninety (90) degrees.

FIG. 6 depicts an illustrative example of a tether 52. The tether 52 is integrally formed to an underside of the jump start terminal cover 16. The tether 52 is a generally pliable and resilient member. The tether 52 includes an anchor 54. The anchor 54 is disposed on a distal end of the tether 52. The anchor 54 may have a barbed feature configured to engage the anchor point 50 in a pinch fit manner.

The cover portion 14 may include an angled recess 56 which is configured to accommodate the tether 52. When the jump start terminal cover 16 is mounted to the cover portion 14, a portion of the tether 52 is fitted into the angled recess 56. Accordingly, the angled recess 56 accommodates the tether 52 so as to prevent the tether 52 from interfering with the attachment of the jump start terminal cover 16 to the cover portion 14.

With reference again to FIG. 7, the jump start terminal cover 16 may further include a shield portion 58. The shield portion 58 bounds the prongs 46 and includes a projecting portion 60 configured to accommodate the anchor point 50 and the anchor 54 of the tether 52. The shield portion 58 has a generally circular cross-section as taken from the plane defined axes "z" and "x", which define a respective length and width of the jump start terminal cover 16. The projecting portion 60 has a generally U-shaped cross-section as taken from the same plane described above. The open end of the projecting portion 60 is open to the shield portion 58 so as to define a generally key-shaped cross-section. The shield portion 58 has an inner surface which is spaced apart from an outer surface of the prongs 46.

The jump start terminal cover 16 includes a top wall 62 and an inner wall portion 64. The inner wall portion 64 is recessed with respect to a peripheral edge of the top wall 62 so as to define a lip 66 for which the jump start terminal cover 16 may be lifted from the jump start terminal housing 20. The inner wall portion 64 extends from a bottom surface of the top wall 62.

Opposite of the inner wall portion 64 is a register wall 68. The register wall 68 is configured to engage the registration member 36 so as to position the prongs 46 into alignment with the respective slots 34. In particular, the register wall 68 includes a first portion 68*a* which is orthogonal to a second portion 68*b* so as to create a rectangular cross-section configured to receive the edges of the base 38 of the registration member 36.

Figure 8:
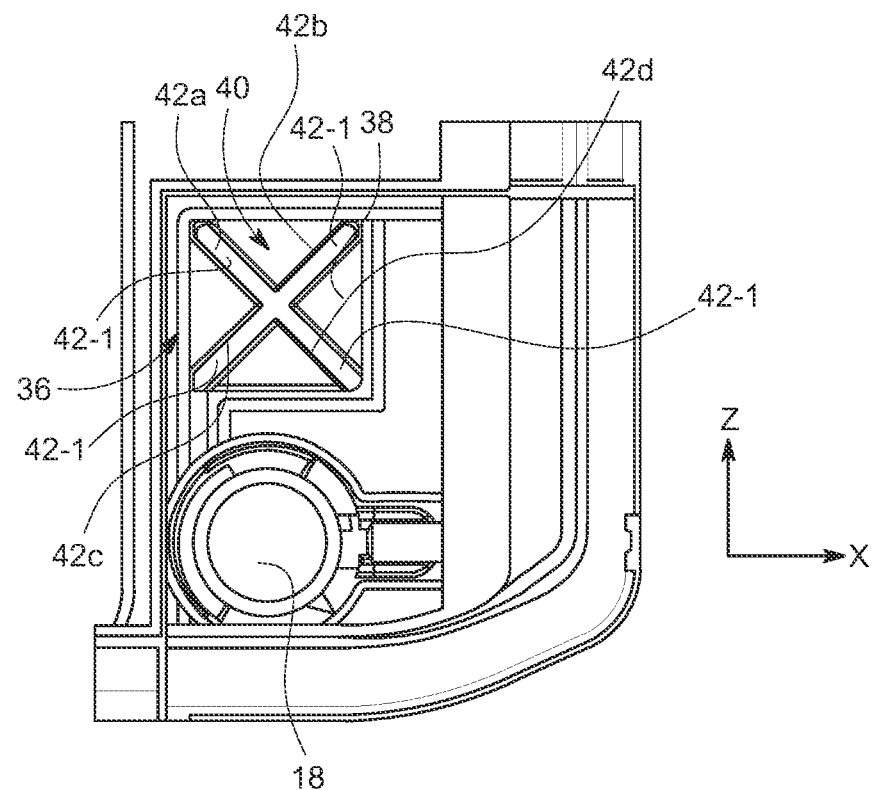
FIG. 8 is a cross-sectional view of FIG. 4 taken along lines 8-8.

With reference now to FIG. 8, a top down view showing the jump start terminal cover 16 engaged with the cover portion 14 is provided. For reference, the top wall 62 of the jump start terminal cover 16 is removed so as to illustrate two aspects of the disclosure.

In a first aspect, the register wall 68 bounds the periphery of the base 38. Thus, the jump start terminal cover 16 will not be seated onto the jump start terminal housing 20 unless the register wall 68 is slid onto the housing floor 30 and bounds the exposed sides of the base 38. Simultaneously, the prongs 46 are guided into a respective slot 34 of the opening 18.

Further, the top edge 42-1 of the panels 42 defining the abutment 40 are angled. As such, the abutment 40 guides the prongs 46 into an engagement with the slots 34 in a direction suitable for installation. That is the top cover 10 is guided along the Z direction from the second housing wall 28 towards the side portion 44 of the peripheral wall 24 of the cover portion 14.

Figure 9:
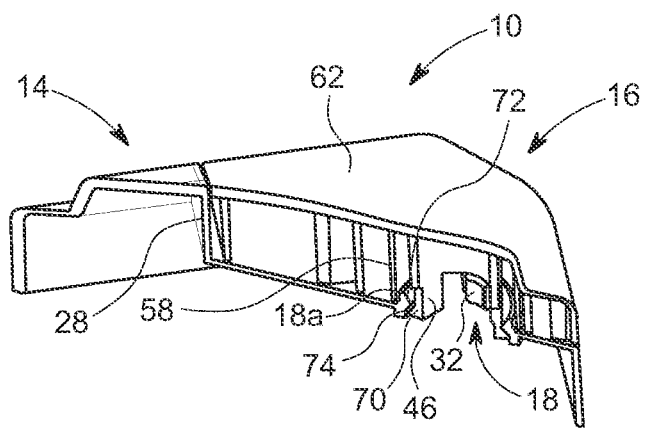
FIG. 9 is a top down view of FIG. 4 showing the engagement of the register wall with the register member.

With reference now to FIG. 9, a depiction showing the prongs 46 engaged with the slots 34 is provided. Each prong 46 has a ramp-shaped member which extends outwardly from a center of the opening 18. The slots 34 to which the prongs 46 are engaged are defined by a generally v-shaped cross-section having a first slanted surface 72 and a second slanted surface 74 such that the slots 34 form an engagement lip 76 which extends inwardly towards a center of the opening 18. Accordingly, upon installation, the first slanted surface 72 presses the prong 46 inwardly until the prong 46 passes the first slanted surface 72 wherein the prong 46 is resiliently urged outwardly to engage the second slanted surface 74. FIG. 9 shows one aspect where the prongs 46 have a generally planar and continuous back-surface. The shield portion 58 is configured to engage the outer surface of the radial wall 18*a,* wherein the radial wall 18*a* is pinched between the shield portion 58 and the prongs 46.

Figure 10:
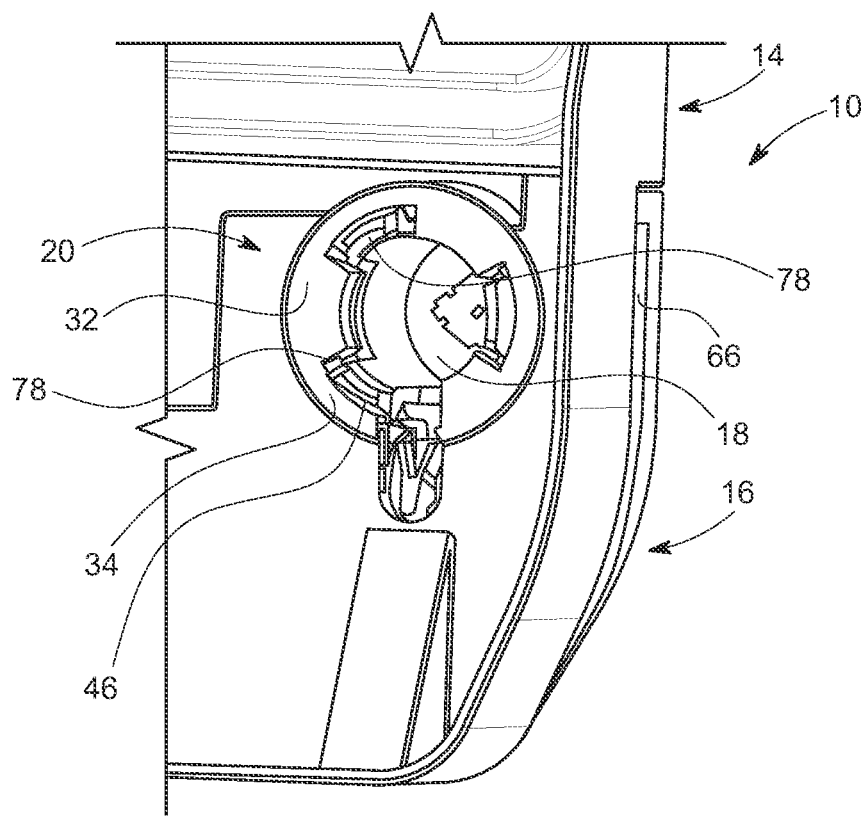
FIG. 10 is an illustration of another aspect of the prongs.

With reference now to FIG. 10, in one aspect the prongs 46 may be made to bend with less force but yet retain the same engagement force. In particular, a back portion of the prongs 46 include a ledge 78 which allows for a deflection of the ramp-shaped member 70. In particular, the ledge 78 is formed on the distal end of the prongs 46 and formed on the back surface of the prongs 46 opposite of the ramp-shaped member 70. As such, less force is required to deflect the prongs 46 inwardly, which reduces the force needed to overcome the second slanted surface 74 of the slots 34.

In operation, the user may simply remove the jump start terminal cover 16 by handling the lip 66 of the jump start terminal cover 16 adjacent to the side portion 44 of the cover portion 14. Specifically, the user pulls upwardly on the lip 66 wherein the force of the pull is centered on the prong 46 which engages the side-slot 34*a*. As the force of the pull is centered on the prong 46, the pulling force is distributed equally along the prong 46 engaged with the side-slot 34*a*. Thus, the force lifting the jump start terminal cover 16 is applied equally along the ramp-shaped surface of the prong 46 engaged with the second surface of the side-slot 34*a*.

When installing or mounting the jump start terminal cover 16 onto the jump start terminal housing 20, the jump start terminal cover 16 itself may obscure alignment of the prongs 46 with the slot 34. Accordingly, the registration member 36 facilitates a blind installation. The assembly worker can simply mount the jump start terminal cover 16 onto the jump start housing wherein the register wall 68 engages with the abutment 40 feature which directs the positioning of the jump start terminal cover 16 into a proper alignment wherein the prongs 46 are positioned to engage the respective slots 34. This helps prevent damage to the prongs 46 which may occur when the prongs 46 are pressed against a tab 32 rather than the slot 34.

While particular embodiments have been illustrated and described herein, it should be appreciated that various other changes and modifications may be made without departing from the spirit and scope of the claimed subject matter. Moreover, although various aspects of the claimed subject matter have been described herein, such aspects need not be realized in combination. It is therefore intended that the appended claims cover all such changes and modifications that are within the scope of the claimed subject matter we claim.

We claim:

1. A top cover for use with a junction box assembly having a jump start terminal, the top cover comprising:
    a cover portion having a peripheral wall, the peripheral wall including a side portion extending along a first plane, the cover portion having an opening for accommodating the jump start terminal, the opening including a plurality of tabs spaced apart from each other and extending radially from an inner peripheral of the opening toward a center of the opening; the plurality of tabs defining a corresponding plurality of slots, wherein one of the plurality of slots is a side-slot extending orthogonal to the side portion; and
    a jump start terminal cover configured to cover the jump start terminal, the jump start terminal cover having a plurality of prongs corresponding to the plurality of slots, wherein one of the plurality of prongs engages the side-slot so as to reduce a force required to remove the jump start terminal cover.

2. The top cover as set forth in claim 1, wherein the jump start terminal cover includes a tether, the tether configured to attach to an anchor point of the cover portion.

3. The top cover as set forth in claim 1, wherein the jump start terminal cover includes a top wall and an inner wall portion, the inner wall portion being recessed with respect to a peripheral edge of the top wall and extending from a bottom surface of the top wall.

4. The top cover as set forth in claim 1, wherein the jump start terminal cover includes a shield portion, the shield portion bounding an outer periphery of the plurality of prongs.

5. The top cover as set forth in claim 1, wherein the cover portion includes a cover housing defined by a first housing wall, a second housing wall and a housing floor, the first housing wall orthogonal to the second housing wall, the opening disposed on the housing floor.

6. The top cover as set forth in claim 4, wherein each of the plurality of prongs is longer than the shield portion.

7. The top cover as set forth in claim 6, wherein the plurality of prongs is three prongs and the plurality of slots is three slots.

8. The top cover as set forth in claim 5, further including a registration member disposed on the housing floor, the registration member having a base and an abutment disposed on the base so as to be elevated relative to the housing floor.

9. The top cover as set forth in claim 8, further including a register wall, the register wall configured to engage the registration member so as to position the plurality of prongs into an alignment with a respective one of the plurality of slots.

10. The top cover as set forth in claim 9, wherein the abutment includes at least one panel, the panel disposed on the base, the at least one panel having a height configured to engage a bottom surface of the jump start terminal cover.

11. The top cover as set forth in claim 10, wherein the at least one panel has a top edge, the top edge being angled downwardly from a center of the base to an edge of the base.

* * * * *